(12) United States Patent
Han et al.

(10) Patent No.: US 9,059,439 B2
(45) Date of Patent: Jun. 16, 2015

(54) RECHARGEABLE BATTERY HAVING SAFETY DEVICE WITHIN

(75) Inventors: Man-Seok Han, Yongin-si (KR); Chong-Hoon Lee, Yongin-si (KR); Sung-Soo Kim, Yongin-si (KR); Sae-Weon Roh, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 938 days.

(21) Appl. No.: 13/238,381

(22) Filed: Sep. 21, 2011

(65) Prior Publication Data
US 2012/0107676 A1 May 3, 2012

(30) Foreign Application Priority Data

Nov. 2, 2010 (KR) .................. 10-2010-0108352

(51) Int. Cl.
*H01M 2/02* (2006.01)
*H01M 2/06* (2006.01)
(Continued)

(52) U.S. Cl.
CPC .............. *H01M 2/06* (2013.01); *H01M 2/0212* (2013.01); *H01M 10/052* (2013.01); *H01M 10/058* (2013.01); *H01M 2200/00* (2013.01)

(58) Field of Classification Search
CPC ......... H01M 2/06; H01M 2/26; H01M 2/266; H01M 2/30; H01M 2/04; H01M 2/0456; H01M 2/0287; H01M 2/0275; H01M 2/026; H01M 2/0212; H01M 2/021; H01M 2/0207; H01M 10/045; H01M 10/052; H01M 10/04235; H01M 2200/00; H01M 2200/20; Y02E 60/122
See application file for complete search history.

(56) References Cited

U.S. PATENT DOCUMENTS

| 6,187,472 B1 | 2/2001 | Shiota et al. |
| 7,267,906 B2 | 9/2007 | Mizuta et al. |
| 7,579,111 B2 | 8/2009 | Mizuta et al. |

(Continued)

FOREIGN PATENT DOCUMENTS

| JP | 10-247482 A | 9/1998 |
| JP | 10-294097 A | 11/1998 |

(Continued)

OTHER PUBLICATIONS

Korean Notice of Allowance issued by KIPO on Aug. 31, 2012 in connection with Korean Patent Application No. 10-2010-0108352 and Request for Entry of the Accompanying Office Action attached herewith.

(Continued)

*Primary Examiner* — Raymond Alejandro
(74) *Attorney, Agent, or Firm* — Robert E. Bushnell, Esq.

(57) ABSTRACT

A rechargeable battery improving safety by discharging a gas when swelling occurs. The rechargeable battery includes an electrode assembly having a first electrode plate and a second electrode plate arranged at opposite sides of a separator, a pouch to accommodate the electrode assembly, the pouch having a plurality of inner sides, a first tab connected to the first electrode plate and a second tab connected to the second electrode plate, the first tab and the second tab extending to an outside of the pouch and a safety device arranged within the pouch and including a bonding member bonded to one of the inner sides of the pouch, a fin member including a tip facing and being spaced-apart from one of the inner sides of the pouch, and a linking member connecting the fin member to the bonding member.

19 Claims, 9 Drawing Sheets

(51) Int. Cl.
*H01M 10/052* (2010.01)
*H01M 10/058* (2010.01)

(56) References Cited

U.S. PATENT DOCUMENTS

2005/0221173 A1* 10/2005 Tatebayashi et al. ......... 429/161
2006/0068275 A1* 3/2006 Chung et al. .................. 429/121

FOREIGN PATENT DOCUMENTS

| JP | 2002-056835 | A | 2/2002 |
| JP | 2005-203262 | A | 7/2005 |
| KR | 1998059764 | | 11/1998 |
| KR | 2003-0033216 | A | 5/2003 |
| KR | 10-2006-0091788 | A | 8/2006 |

OTHER PUBLICATIONS

Korean Office action issued by KIPO on Dec. 30, 2011, corresponding to KR 10-2010-0108352 and Request for Entry attached herewith.

* cited by examiner

RECHARGEABLE BATTERY HAVING SAFETY DEVICE WITHIN

CLAIM OF PRIORITY

This application makes reference to, incorporates the same herein, and claims all benefits accruing under 35 U.S.C. §119 from an application for RECHARGEABLE BATTERY earlier filed in the Korean Intellectual Priority Office on 2 Nov. 2010 and there duly assigned Serial No. 10-2010-0108352.

BACKGROUND OF THE INVENTION

1. Field of the Invention

The described technology relates generally to a design for a rechargeable battery capable of discharging an internal gas when swelling occurs.

2. Description of the Related Art

Unlike a primary battery, a rechargeable battery is capable of being charged and discharged. Due to such an advantage, the rechargeable battery has been widely used in electronic devices such as cellular phones, laptop computers, and camcorders. For example, a lithium rechargeable battery has been widely used because of its high operation voltage and high energy density per unit weight.

The lithium rechargeable battery is manufactured in various shapes. For example, the lithium rechargeable battery can be manufactured to have a cylindrical shape, a rectangular shape or a pouch shape. The pouch-shaped rechargeable battery includes an electrode assembly and a pouch exterior material. The electrode assembly includes a positive electrode plate, a negative electrode plate, and a separator. The pouch exterior material accommodates the electrode assembly and electrolyte solution therein.

The rechargeable battery is charged and discharged through interaction of lithium ions between the positive electrode plate and the negative electrode plate. In the pouch-shaped rechargeable battery, an overcharge condition, an over-discharge condition, an internal electric short condition, and an overheating condition cause an internal temperature of the pouch exterior material to increase and cause an internal gas pressure to rise, to excessive levels. Due to such gas pressure, a swelling phenomenon of the pouch exterior material occurs. The above information disclosed in this Background section is only for enhancement of understanding of the background of the described technology and therefore it may contain information that is not prior art as per 35 U.S.C. §102.

SUMMARY OF THE INVENTION

The described technology has been made in an effort to provide a rechargeable battery having advantages of improved safety by including a safety device within the pouch that can puncture the pouch and expel an internal gas when swelling occurs.

An exemplary embodiment provides a rechargeable battery including an electrode assembly having a first electrode plate and a second electrode plate arranged at opposite sides of a separator, a pouch to accommodate the electrode assembly, the pouch having a plurality of inner sides, a first tab connected to the first electrode plate and a second tab connected to the second electrode plate, the first tab and the second tab extending to an outside of the pouch and a safety device arranged within the pouch and including a bonding member bonded to one of the inner sides of the pouch, a fin member including a tip facing and being spaced-apart from one of the inside sides of the pouch, and a linking member connecting the fin member to the bonding member.

The pouch may include a first portion accommodating the electrode assembly and a second portion covering the electrode assembly and thermally bonded to the first portion at a periphery of the electrode assembly, wherein the first tab and the second tab extend in opposite directions from the electrode assembly. The pouch may include a first space to accommodate the electrode assembly and a plurality of second spaces, wherein one of the second spaces may be arranged on each side of each of the first to and the second tab, and wherein the safety device may be arranged within at least one of the second spaces. The pouch may include a first portion and a second portion thermally bonded together at a periphery of the electrode assembly to accommodate the electrode assembly, wherein the bonding member may include a first bonding member bonded to an inner side of the first portion and a second bonding member bonded to an inner side of the second portion and facing the first bonding member.

The link member may include a first link member connecting an end of the fin member opposite the tip to the first bonding member and a second link member connecting the end of the fin member opposite the tip to the second bonding member. The pouch may include a multi-layered structure that includes a thermal bonding polymer sheet, a metal sheet, and one of a PET sheet, a nylon sheet, and a PET-nylon composite sheet, the bonding member being comprised of a thermal bonding polymer adapted to be thermally bonded to the thermal bonding polymer sheet of the pouch. The fin member may include one of metal and plastic, the link member may include one of metal and plastic. The fin member may include one of stainless steel, polypropylene, polyethylene, and polytetrafluoroethylene (PTFE), the link member may include one of stainless steel, poly propylene, polyethylene, and PTFE.

The pouch may include a first portion and a second portion thermally bonded to each other at a periphery of the electrode assembly and accommodating the electrode assembly, the first and second portions may include a side surface surrounding a side of the electrode assembly and coupled at a sealing bonding line, the tip of the fin member faces the side surface upon swelling of the pouch. The fin member may be parallel to the first tab and the second tab and extend in a first direction, the side surface of the first and second portions cross the first direction. The fin member may be arranged perpendicular to the first and second tabs and extends in a second direction, the side surface of the first and second portions may cross the second direction. The linking member may be pivotally attached to each of the bonding member and the fin member. The linking member may be pivotally attached to the bonding member at a first end and being pivotally attached to the fin member at a second and opposite end. The pouch may include a first portion and a second portion bonded together to form a facing internal side to accommodate the electrode assembly, and the tip is spaced apart from the facing internal side of the pouch, and the tip is provided to face the facing internal side of the pouch upon swelling of the pouch.

BRIEF DESCRIPTION OF THE DRAWINGS

A more compete appreciation of the invention, and many of the attendant advantages thereof, will be readily apparent as the same becomes better understood by reference to the following detailed description, when considered in conjunction with the accompanying drawings in which like reference symbols indicate the same or similar components, wherein.

DETAILED DESCRIPTION OF THE INVENTION

Figure 1:
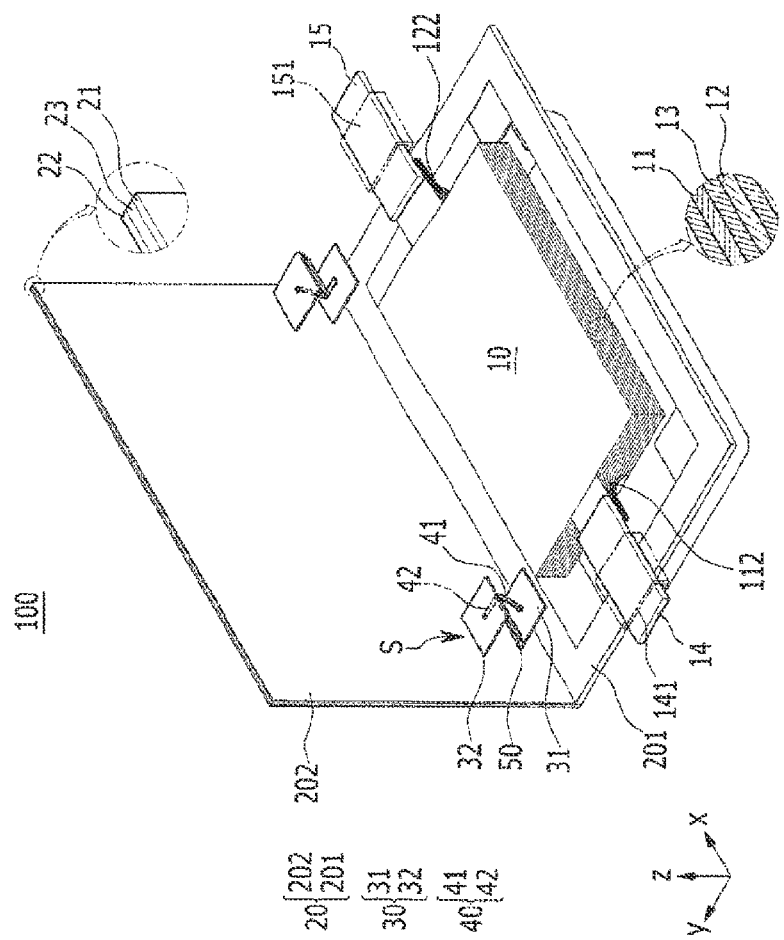
FIG. 1 is an exploded perspective view of a rechargeable battery according to the first exemplary embodiment.

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Turning now to FIG. 1, FIG. 1 is an exploded perspective view of a rechargeable battery according to the first exemplary embodiment. Referring to FIG. 1, a rechargeable battery 100 according to the first exemplary embodiment includes an electrode assembly 10 and a safety device S arranged within a pouch 20. The safety device S includes a link member 40 connecting a bonding member 30 to a fin member 50.

The electrode assembly 10 includes a first electrode plate 11 and a second electrode plate 12 stacked with a separator 13 interleaved therebetween. The first electrode plate 11 and the second electrode plate 12 are formed as a single plate. For convenience, the first electrode plate 11 is referred to as a positive electrode plate, and the second electrode plate 12 is referred to as a negative electrode plate.

Although it is not shown, the electrode assembly may be a stacked structure by folding the positive electrode plate, the separator, and the negative electrode plate in a zigzag manner. Instead, the electrode assembly may be a jelly roll structure by winding the positive electrode plate, the separator, and the negative electrode plate.

The positive electrode plate 11 includes coated regions and uncoated regions 112. The coated regions are a metal film, current collector coated with an active material, and the uncoated regions 112 are not coated with the active material. The uncoated regions 112 of the positive electrode plates 11 are stacked, pressurized, and connected via welding.

The negative electrode plate 12 includes coated regions and uncoated regions 122. The coated regions are a metal film current collector coated with an active material different from that of the positive electrode plate 11. The uncoated regions 122 are not coated with the active material. The uncoated regions 122 of the negative electrode plates 12 are stacked, pressurized, and connected via welding.

A first tab 14 is connected to the uncoated regions 112 through welding and draws out the positive electrode plate 11 of the electrode assembly 11 to an outside of the pouch 20. For convenience, such a first to 14 is referred as a positive electrode tab 14. The positive electrode tab 14 is adhered to and sealed to the pouch 20 via a sealing bonding member 141 interleaved therebetween. Accordingly, the positive electrode tab 14 forms an electrically insulated structure with the pouch 20.

A second tab 15 is connected to the uncoated regions 122 through welding and draws out the negative electrode plate 12 of the electrode assembly 10 to an outside of the pouch 20. For convenience, such a second tab 15 is referred as a negative electrode tab 15. The negative electrode tab 15 is adhered to and sealed to the pouch 20 via a sealing bonding member 151 interleaved therebetween. Accordingly, the negative electrode tab 15 forms an electrically insulated structure with the pouch 20.

In FIG. 1, the positive electrode tab 14 and the negative electrode to 15 draw out from the electrode assembly 10 in the opposite directions. That is, the positive electrode tab 14 and the negative electrode tab 15 are disposed at opposite sides of the electrode assembly 10. The positive electrode tab 14 and the negative electrode tab 15 are disposed at opposite ends and extend in a first direction (x-axis direction) of the electrode assembly 10. Alternatively, although not illustrated, the positive electrode tab and the negative electrode tab may instead be disposed in parallel by being drawn out on a same side of the electrode assembly.

The pouch 20 includes a first portion 201 that accommodates the electrode assembly 10 and a second portion 202 that covers the electrode assembly 10 and is thermally bonded to the first portion 201 on an outside of the electrode assembly 10. For example, the first portion 201 may have a concave shape to accommodate the electrode assembly 10 and the second portion 202 may have a flat shape to cover the electrode assembly 10 accommodated within the first portion 201.

Each of first and second portions 201 and 202 of pouch 20 include a multi-layered sheet structure that includes a thermal bonding polymer sheet 21 arranged on an inner side to provide insulating and bonding action, one of a PET sheet, a nylon sheet, and a PET-nylon a composite sheet 22 arranged at an outer side to provide a protecting action and a metal sheet 23 arranged in between sheets 21 and 22 to provide mechanical strength. Hereinafter, sheet 22 will be referred to as a nylon sheet 22 for convenience. The metal sheet 23 may be an aluminum sheet.

Referring now to FIG. 4A to FIG. 7, arranged within the first and second portions 201 and 202 of pouch 20 is a first space occupied by the electrode assembly 10 and a plurality of second spaces C1, C2, C3 and C4 that are not occupied by the electrode assembly 10. These second or extra spaces may have a thickness in the z-axis direction as much as ½ the thickness of the first space that includes the electrode assembly 10. Although not illustrated, instead of having the first portion 201 being the only portion of pouch to include a concave portion to accommodate the electrode assembly 10, second portion 202 instead may include the concave portion that accommodates the electrode assembly 10 and the first portion 201 may be flat. Alternatively, both the first and second portions 201 and 202 may include concave portions that face each other to accommodate the electrode assembly 10. When both the first and second portions 201 and 202 include concave portions, pouch 20 can easily accommodate an extra thick electrode assembly 10.

Figure 2:
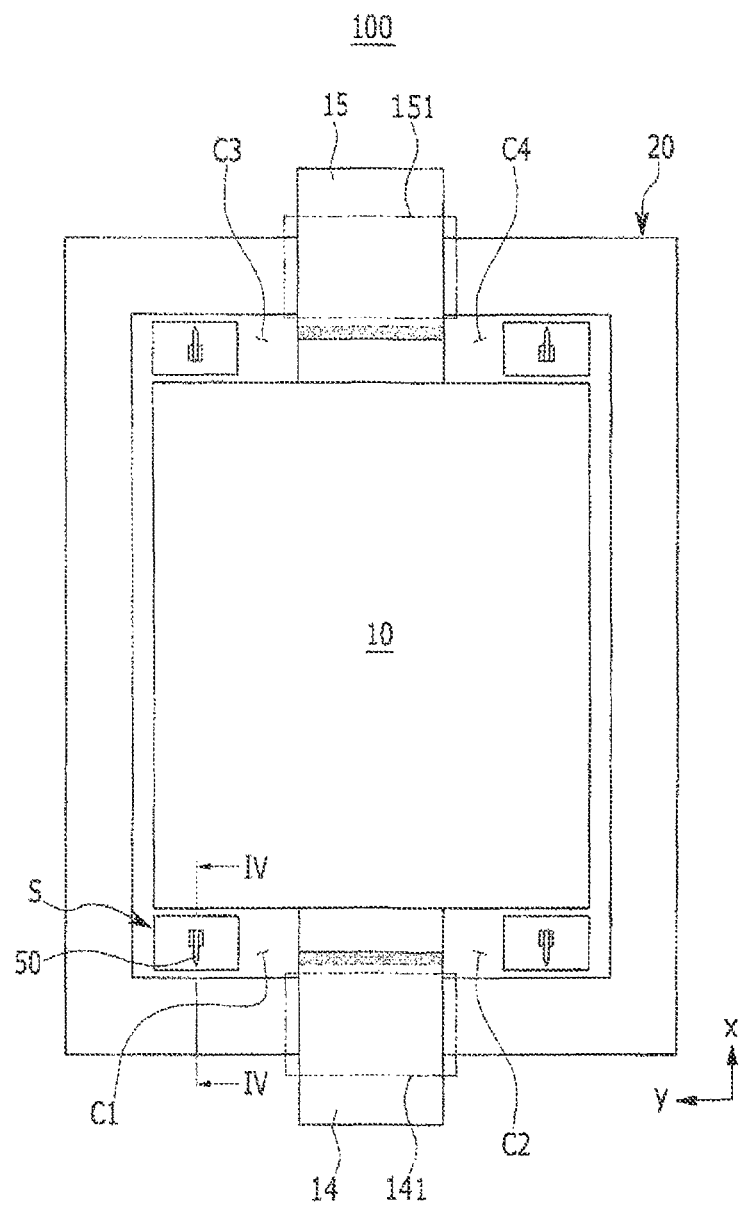
FIG. 2 is a top view of arrangement of an electrode assembly and a fin member in a pouch of a rechargeable battery according to the first exemplary embodiment.

Turning now to FIG. 2, FIG. 2 is a top view illustrating the arrangement of an electrode assembly 10 and a fin member 50 in a pouch 20 of a rechargeable battery 100 according to the first exemplary embodiment. Referring to FIGS. 1 and 2, the positive electrode tab 14 and the negative electrode tab 15 are inserted within the sealing bonding members 141 and 151, respectively and fixed between the first and second portions 201 and 202 of pouch 20 where first and second portions 201 and 202 are thermally bonded to each other. The positive electrode tab 14 and the negative electrode tab 15 draw out in an x-axis direction at opposite ends of pouch 20.

The pouch 20 is formed by thermally bonding the first and second portions 201 and 202 together while the electrode assembly 10 is arranged therein. Accordingly, due to the second or extra spaces C1, C2, C3, and C4 within pouch 20, spaces C1, C2, C3, and C4 are present at opposite sides in a second direction (y-axis direction) of both the positive and negative electrode tabs 14 and 15. As will be described later, a safety device S may be arranged within one or a plurality of the second spaces C1, C2, C3 and C4 to puncture pouch 20 upon pouch 20 becoming swollen due to an internal pressure within pouch 20 rising to abnormal levels, allowing gas within pouch 20 to safely escape.

In the first exemplary embodiment, the safety device S is installed in all four second spaces C1, C2, C3, and C4 to puncture pouch 20 to discharge an internal gas upon an occurrence of swelling within the pouch 20. The larger the number of safety devices S employed may further improve the safety of the rechargeable battery for a given size electrode assembly 10 and pouch 20.

The safety device S includes a bonding member 30, a link member 40 and a fin member 50. The bonding member 30 is thermally bonded to an inner side of the pouch 20 and moves integrally with the pouch 20 according to a swelling of the pouch 20. For example, since the pouch 20 swells in a z-axis direction, the bonding member 30 moves in the z-axis direction together with the pouch 20.

In case of swelling, the link member 40 transfers movement of the pouch 20 and the bonding member 30 to the fin member 50. That is, the link member 40 transfers the movement of the bonding member 30 in the z-axis direction to a movement of fin member 50 in the x-axis direction by mechanically connecting the fin member 50 to the bonding member 30.

One end of the fin member 50 is connected to the link member 40, and the other end of the fin member 50 includes a sharp tip 51 that faces an internal side of pouch 20. The tip 51 is provided to face the pouch 20 in order to open the pouch 20 by being inserted through pouch 20 upon swelling of pouch 20. During normal operation of the battery 100, the tip 51 is maintained at a distance G from a facing internal side of pouch 20 (see FIG. 4A). Battery 100 can be designed so that the degree of swelling needed to cause fin member 50 to puncture pouch 20 varies according to the distance G the tip 51 of fin member 50 is from a facing side of pouch 20 during normal operation of the battery.

Meanwhile, although the present invention has previously been described in that the movement direction of the fin member 50 by the link member 40 is in the x-axis direction for convenience, the present invention is in no way so limited. That is, the fin member 50 may instead move in various other directions according to a connection structure of the link member 40 and the fin member 50 and a swelling direction of the pouch 20.

Figure 3:
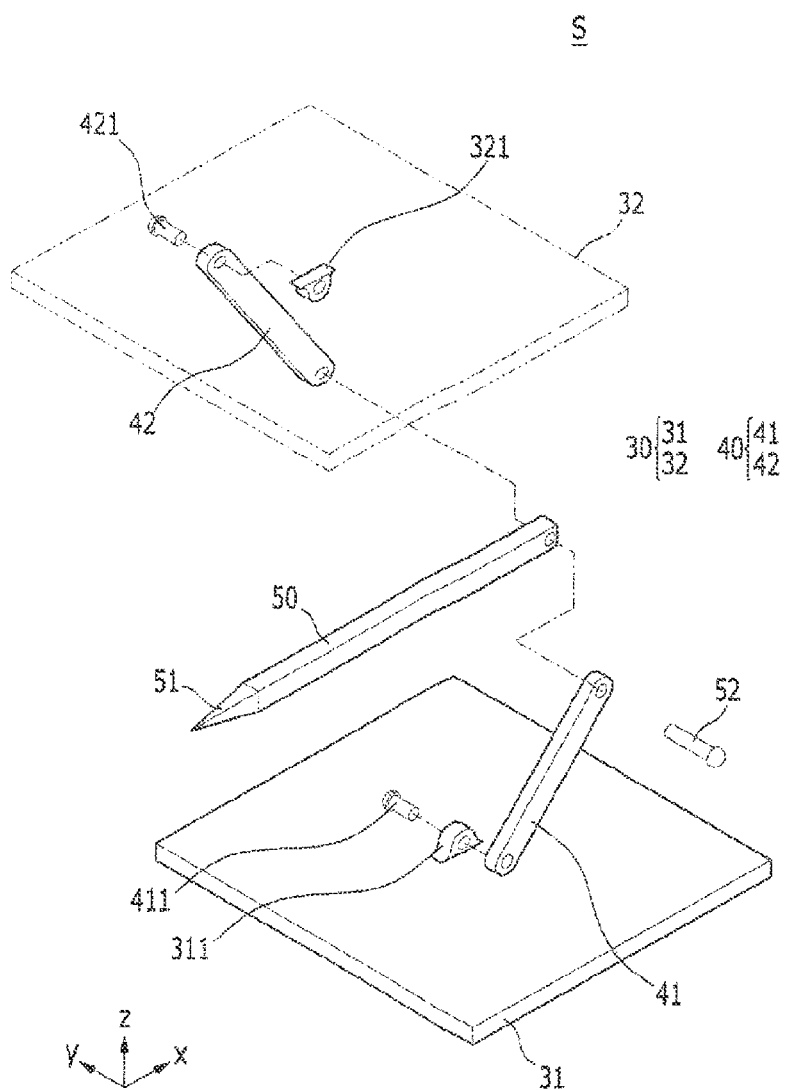
FIG. 3 is an exploded perspective view of a fin member and a link member shown in FIG. 1.
Figure 4A:
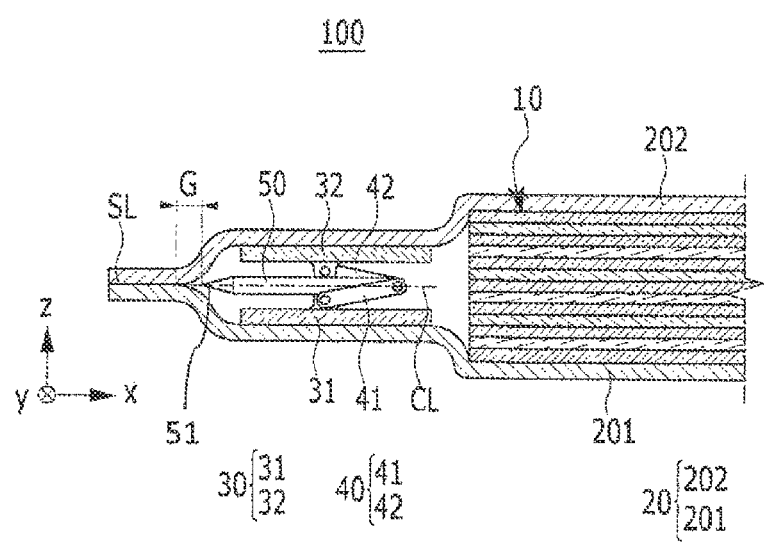
FIG. 4A is a cross-section view of FIG. 2 taken along the line IV-IV, which shows a state diagram for normal operation.
Figure 4B:
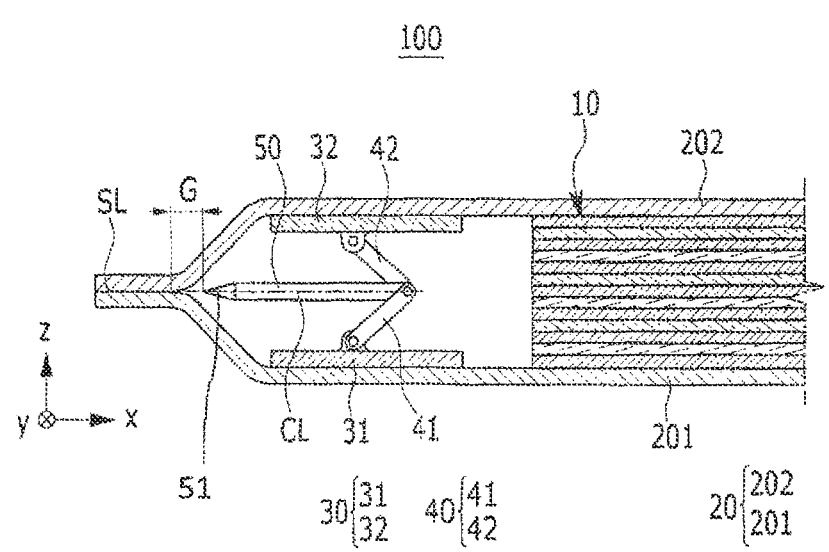
FIG. 4B is a diagram illustrating an initial swelling state of FIG. 4A.

Turning now to FIGS. 3, 4A and 4B, FIG. 3 is an exploded perspective view of a safety device S of FIG. 1, FIG. 4A is a cross-section view of FIG. 2 taken along the line IV-IV, which shows a state diagram during normal operation of battery 100 when there is no swelling, and FIG. 4B is a cross-section view of FIG. 2 taken along the line IV-IV during an initial swelling state battery 100. Referring to FIGS. 3, 4A, and 4B, the bonding member 30 of safety device S includes first and second bonding members 31 and 32 facing each other. The first bonding member 31 is bonded to an inner side of the first portion 201 via thermal bonding and the second bonding member 32 is bonded to an inner side of the second portion 202. As discussed previously, the first and second portions 201 and 202 enclose a first space occupied by the electrode assembly 10 and a plurality of second spaces C1, C2, C3 and C4 to accommodate safety devices S, these second spaces may have a thickness about ½ of the thickness of the electrode assembly 10.

The first and second bonding members 31 and 32 may include a thermal bonding polymer that can be thermally bonded. Therefore, the first and second bonding members 31 and 32 may be thermally bonded to inner sides of the first and second portions 201 and 202 at a location corresponding to ones of the second spaces C1, C2, C3 and C4 within pouch 20 via thermal bonding. By using a thermal bonding polymer for first and second bonding members 31 and 32, an additional process of bonding the first and second bonding members 31 and 32 to inner sides of the first and second portions 201 and 202 of pouch 20 is not needed.

The link member 40 includes first and second link members 41 and 42 connecting the first and second bonding members 31 and 32 respectively to fin member 50. For example, a first end of first link member 41 is rotatably connected to a fixing unit 311 of the first bonding member 31 by fixing pin 411, and a second and opposite end of first link member 41 is rotatably connected to an end of fin member 50 opposite tip 51 by pin 52.

Similarly, a first end of second link member 42 is rotatably connected to fixing unit 321 of second bonding member 32 by fixing pin 421, and a second and opposite end of second link member 42 is rotatably connected to an end of fin member 50 opposite tip 51 by pin 52.

Upon swelling of pouch 20, as first and second bonding members 31 and 32 move in the z-axis direction, the fin member 50 connected to the first and second link members 41 and 42 moves in the x-axis direction. As a result, as illustrated in FIGS. 4A and 4B, the tip 51 of the fin member 50 facing a sealing bonding line (SL) of pouch 20 may open the pouch 20 by poking a hole in pouch 20 when swelling occurs.

Meanwhile, the fin member 50 faces sealing bonding line SL of pouch 20 while being arranged within second spaces C1, C2, C3, and C4 within pouch 20. That is, tip 51 of fin member 50 is arranged to face a side surface of pouch 20 when swelling occurs and is arranged in parallel with the x-axis direction (see FIGS. 2 and 4A). Therefore, the tip 51 faces a side (yz side) and moves in the x-axis direction within pouch 20 upon swelling (see FIG. 4B).

Since the link member 40 and the fin member 50 are in contact with an electrolyte solution within the pouch 20, the link member 40 and the fin member 50 are made out of a material that does not react upon long term exposure to the electrolytic solution. For example, the link member 40 and the fin member 50 may be made out of a metal such as stainless steel or a plastic such as poly propylene, polyethylene and polytetrafluoroethylene (PTFE).

Figure 5:
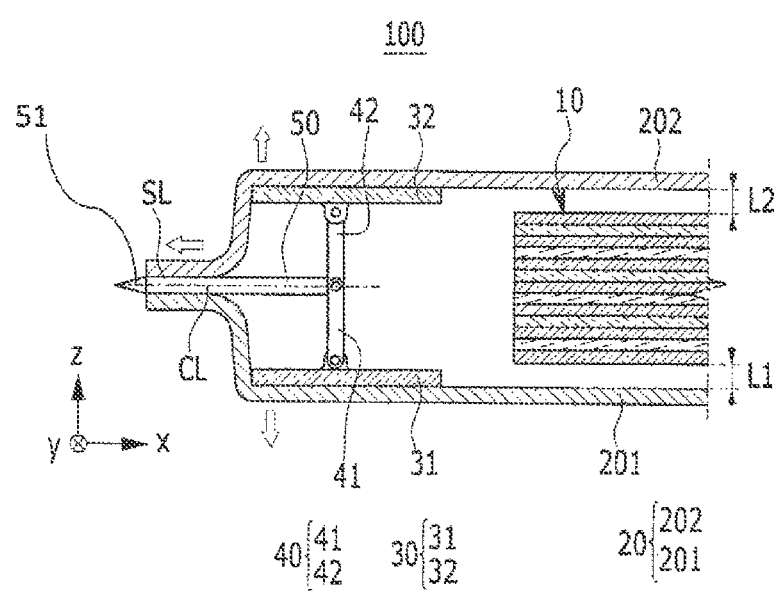
FIG. 5 is a diagram illustrating an operation state of a fin member when swelling occurs in a top-to-bottom direction in a rechargeable battery according to the first exemplary embodiment.
Figure 6:
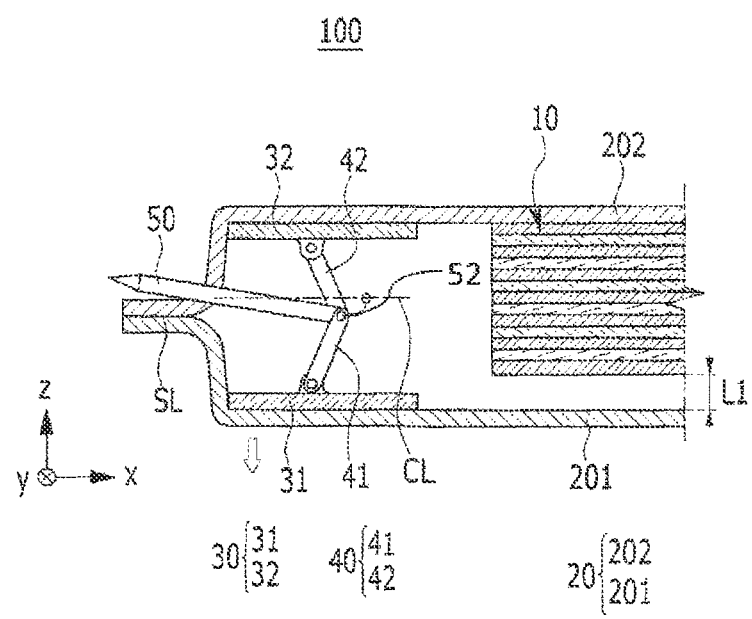
FIG. 6 is a diagram illustrating an operation state of a fin member when swelling occurs in a downward direction of a rechargeable battery according to the first exemplary embodiment.
Figure 7:
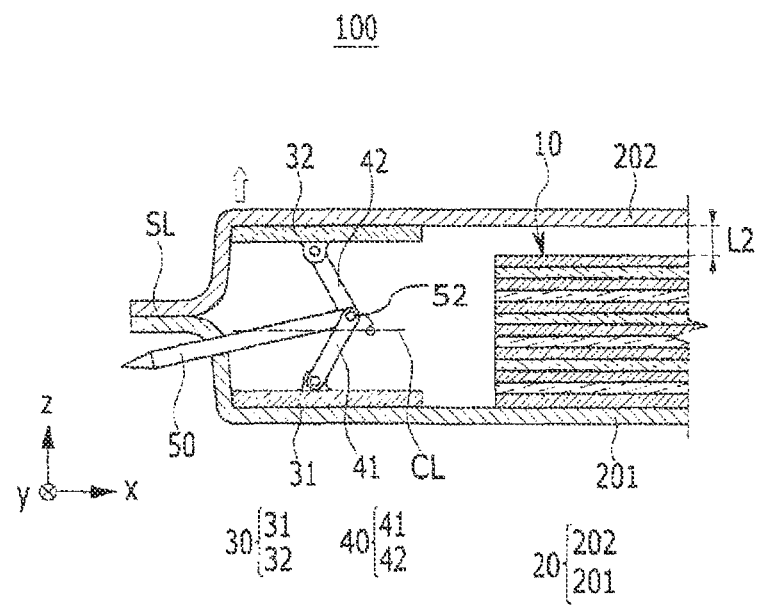
FIG. 7 is a diagram illustrating an operation state of a fin member when swelling occurs in an upward direction of a rechargeable battery according to the first exemplary embodiment.

Turning now to FIGS. 5 through 7, an operation state of the fin member 50 will be described upon swelling of the rechargeable battery 100. The first and second link members 41 and 42 may be designed to have various length ratios. For convenience, a length ratio of 1:1 is described as an example.

Referring now to FIG. 5, FIG. 5 is a diagram illustrating an operation state of a fin member 50 when swelling occurs in a top-to-bottom direction within rechargeable battery 100 according to the first exemplary embodiment. Referring to FIG. 5, the rechargeable battery 100 is identically swollen in both top and bottom directions (+/−z-axis directions). Here, first portion 201 of pouch 20 moves in a down direction (i.e., −z-axis direction) a distance L1 while the second portion 202 of the pouch 20 moves in an up direction (i.e., +z-axis direction) by a distance L2, where L1=L2. Although in reality. L1 may not be equal to L2, for convenience in this example, it is assumed for now that L1=L2.

The first and second bonding members 31 and 32 bonded to an inner side of the first and second portions 201 and 202 of pouch 20 move in the z-axis direction. The first and second link members 41 and 42 move in the x-axis direction while rotating about fixing units 311 and 321. Therefore, the in member 50 moves in the x-axis direction along the center line (CL) to perforate the side of the pouch 20 with tip 51. That is, the fin member 50 opens pouch 20 along sealing bonding line SL to discharge internal gas.

Referring now to FIG. 6, FIG. 6 is a diagram illustrating an operation state of a fin member 50 when swelling occurs only in a downward direction (−z) of a rechargeable battery according to the first exemplary embodiment. Referring to FIG. 6, the rechargeable battery 100 does not swell in an upward direction (+z-axis direction) but only in a downward direction (−z-axis direction). Here, the second portion 202 of the pouch 20 remains stationary and fixed to electrode assembly 10 while the first portion 201 moves in the −z-axis direction a first distance L1 away from the electrode assembly 10.

The first bonding member 31 bonded to an inner side of the first portion 201 moves in a downward direction along the −z-axis and the second bonding member 32 bonded to an inner side of the second portion 202 remains stationary. The first and second link members 41 and 42 move in the x-axis direction while rotating about fixing units 311 and 321 respectively and move in the downward direction along the −z-axis at the pin 52. Therefore, tip 51 moves in an upward (+z) direction from the center line CL and along the x-axis direction to perforate second portion 202 of pouch 20 to discharge the internal gas.

Turning now to FIG. 7, FIG. 7 is a diagram illustrating an operation state of a fin member when swelling occurs only in an upward (+z) direction of a rechargeable battery 100 according to the first exemplary embodiment. Referring to FIG. 7, the rechargeable battery 100 does not swell in the downward (−z) direction but only in the upward (+z) direction. In this scenario, the first portion 201 of the pouch 20 remains stationary and fixed to electrode assembly 10 while the second portion 202 moves in the +z-axis direction by second distance L2 away from the electrode assembly 10.

The second bonding member 32 bonded to the inner side of the second portion 202 moves in the upward (+H) direction by distance L2 and the first bonding member 31 bonded to the inner side of the first portion 201 remains stationary. The first and second link members 41 and 42 move in the x-axis direction while rotating about the fixing units 311 and 321 respectively while moving in the upward (+z) direction at pin 52. Therefore, tip 51 of fin member 50 moves in a downward (−z) direction form the center line (CL) and perforates first portion 201 of pouch 20 to discharge internal gas.

As a variation to the above first embodiment, it may be possible to modify the safety device S so that tip 51 of fin member 50 punctures another sidewall of pouch 20, such as an xz-side of first portion 201 or an xz-side of second portion 202 in the z-axis direction, or even a top side or a bottom side of the pouch 20 by controlling a length ratio of the first and second link members 41 and 42. For example, a length ratio of the first and second link members 41 and 42 can be in the range of 1:10 to 10:1, however, in order to achieve smooth operation, it is preferable that the length ratio of the first and second link members 41 and 42 be in the range of 1:3 to 3:1.

Hereinafter, another exemplary embodiment will be described. Compared with the first exemplary embodiment, the detailed descriptions of the same constituent elements are omitted. Only different constituent elements will be described in detail.

Figure 8:
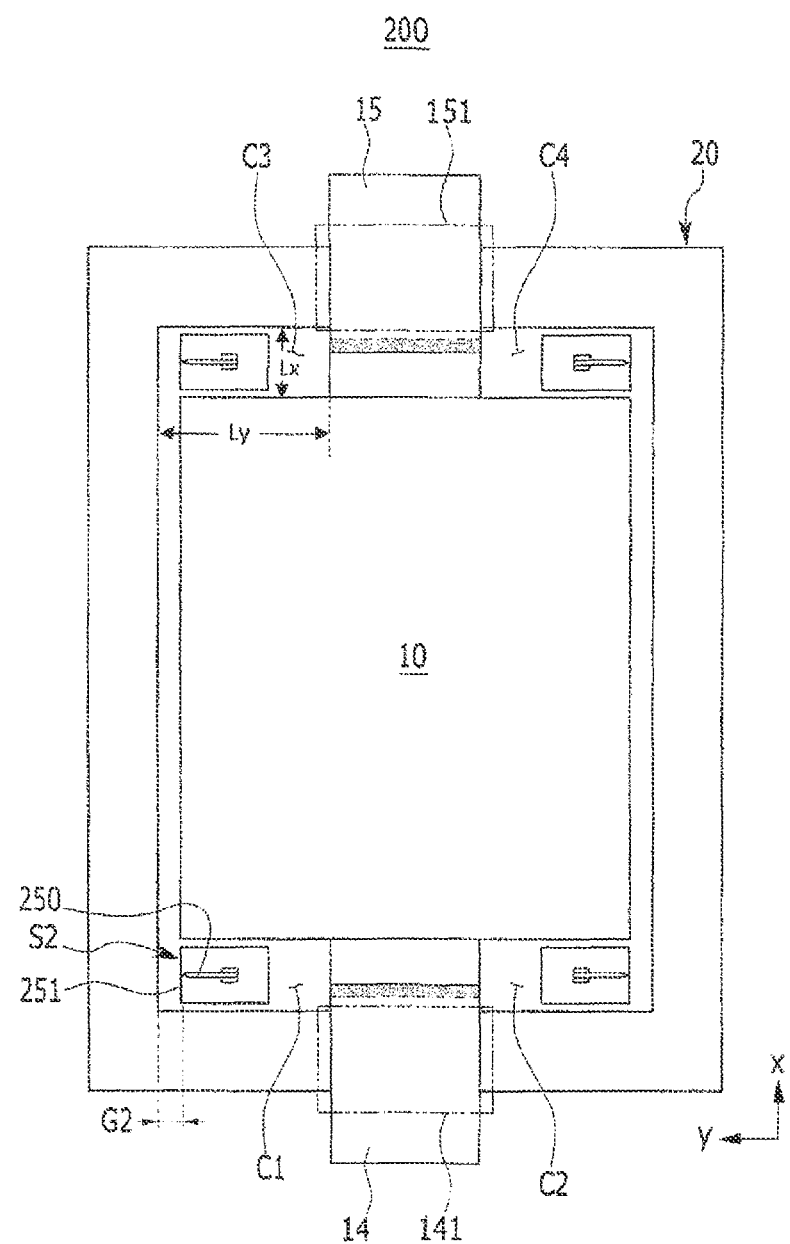
FIG. 8 is a top view illustrating arrangement of an electrode assembly and a fin member in a rechargeable battery according to the second exemplary embodiment.

Turning now to FIG. 8, FIG. 8 is a top view illustrating a rechargeable battery 200 including an electrode assembly 10 and a safety device S2 that includes fin member 250 according to a second exemplary embodiment. Referring to FIG. 8, a fin member 250 of a safety device S2 is disposed to face a side of the pouch 20 within each of second spaces C1, C2, C3, and C4 within pouch 20, and disposed in parallel to the y-axis direction. A tip 251 faces a side (xz side) and moves in the y-axis direction to perforate the sides of the pouch 20.

When the second spaces C1, C2, C3, and C4 formed between the side of the pouch 20 and the electrode assembly 10 have a distance Ly in the y-axis direction longer than a distance Lx in the x-axis direction, it is possible to better control a moving range of the fin member 250 in the y-axis direction in the safety device S2 than the moving range of the first exemplary embodiment in the x-axis direction. That is, a predetermined degree of freedom for gap G2 between the tip 251 of fin member 250 of the safety device S2 and the pouch 20 is improved. Accordingly, it is easier to more precisely control exactly when (under what degree of swelling) the pouch 20 is to be perforated by the fin member 250 using the arrangement in FIG. 8 as compared to the arrangement of the first embodiment.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery, comprising:
a pouch enclosing a first space and a plurality of second spaces, the pouch having an upper wall, a lower wall opposite the upper wall and a plurality of side portions connecting the lower wall to the upper wall;
an electrode assembly arranged within the first space within the pouch, the electrode assembly having a first electrode plate and a second electrode plate arranged at opposite sides of a separator;
an electrolyte solution arranged within the pouch;
a first tab connected to the first electrode plate and a second tab connected to the second electrode plate, the first tab and the second tab extending to an outside of the pouch and extending between adjoining ones of the second spaces within the pouch; and
a safety device arranged within one of the second spaces within the pouch while being external to the electrode assembly, the safety device including a bonding member bonded to an inner side of one of the upper and lower walls of the pouch, a fin member including a sharp tip facing and being spaced-apart from an inner side of one of the side portions of the pouch, and a link member connecting the fin member to the bonding member, the safety device to move the sharp tip of the fin member towards the one of the side portions of the pouch to perforate a hole in the pouch upon a buildup of internal pressure within the pouch, wherein the bonding member includes a first bonding member bonded to an inner side of the lower wall of the pouch and a second bonding member bonded to an inner side of the upper wall of the pouch, the first and second bonding members being spaced apart from each other in a thickness direction of the electrode assembly;

and wherein the link member includes a first and a second link member attached to a first end of the fin member, the sharp tip being arranged on a second and opposite end of the fin member, the fin member extending in a direction that is orthogonal to the thickness direction of the electrode assembly, the sharp tip being spaced apart from the one of the side portions of the pouch by a gap, the sharp tip moving towards and perforating a hole in the one of the side portions of the pouch upon a buildup in internal pressure within the pouch.

2. The rechargeable battery of claim 1, wherein the pouch comprises:
   a first portion accommodating the electrode assembly, the first portion corresponding to the lower wall and adjoining portions of the side portions of the pouch; and
   a second portion corresponding to the upper wall and adjoining portions of the side portions of the pouch, the second portion covering the electrode assembly and being thermally bonded to the first portion at a periphery of the electrode assembly, wherein the first tab and the second tab extend in opposite directions from the electrode assembly.

3. The rechargeable battery of claim 1, wherein the pouch comprises a first portion and a second portion thermally bonded together at a periphery of the electrode assembly to accommodate the electrode assembly,
   wherein upon a buildup of internal pressure within the pouch, the first and second bonding members and corresponding lower and upper walls of the pouch move apart from each other in a thickness direction of the electrode assembly.

4. The rechargeable battery of claim 3, wherein the link member
   transfers the movement of the upper and lower walls of the pouch and the first and second bonding members in the thickness direction to a movement of the fin member in a lateral direction orthogonal to the thickness direction.

5. The rechargeable battery of claim 1, wherein the pouch comprises a multi-layered structure that includes a thermal bonding polymer sheet, a metal sheet, and one of a polyethylene terephthalate sheet, a nylon sheet, and a polyethylene terephthalate-nylon composite sheet, the bonding member being comprised of a thermal bonding polymer adapted to be thermally bonded to the thermal bonding polymer sheet of the pouch.

6. The rechargeable battery of claim 1, the fin member being comprised of a material selected from a group consisting of metal and plastic, the link member being comprised of a material selected from a group consisting of metal and plastic.

7. The rechargeable battery of claim 1, the fin member being comprised of a material selected from a group consisting of stainless steel, polypropylene, polyethylene, and polytetrafluoroethylene, the link member being comprised of a material selected from a group consisting of stainless steel, poly propylene, polyethylene, and polytetrafluoroethylene.

8. The rechargeable battery of claim 1, wherein the pouch comprises a first portion and a second portion thermally bonded to each other at a periphery of the electrode assembly and accommodating the electrode assembly,
   the first and second portions comprise a side surface surrounding a side of the electrode assembly and coupled at a sealing bonding line that correspond to the side portions of the pouch.

9. The rechargeable battery of claim 8, wherein the fin member is parallel to the first tab and the second tab and extends in a first direction, the side surface of the first and second portions cross the first direction.

10. The rechargeable battery of claim 8, wherein the fin member is arranged perpendicular to the first and second tabs and extends in a second direction, the side surface of the first and second portions cross the second direction.

11. The rechargeable battery of claim 1, each of the first and second link members being pivotally attached to the first and second bonding members respectively and to the fin member.

12. The rechargeable battery of claim 1, each of the first and second link members being pivotally attached to the first and second bonding members respectively at a first end and being pivotally attached to the fin member at a second and opposite end.

13. The rechargeable battery of claim 1, wherein the pouch includes a first portion and a second portion bonded together to form a facing internal side to accommodate the electrode assembly.

14. A rechargeable battery, comprising:
   an electrode assembly having a first electrode plate and a second electrode plate arranged at opposite sides of a separator;
   a pouch that encloses a first space to accommodate the electrode assembly and a plurality of second spaces external to the electrode assembly, the pouch having a top face, a bottom face opposite from and spaced apart from the top face in a thickness direction of the electrode assembly, and a plurality of side faces connecting the bottom face to the top face;
   an electrolyte solution arranged within the pouch; and
   a safety device arranged within one of the second spaces within the pouch and including:
      first and second bonding members bonded to inner sides of the bottom and top faces of the pouch respectively,
      a fin member having a sharp tip spaced-apart from a nearest one of side faces of the pouch by a gap, and
      first and second link members connecting the fin member to the first and second bonding members respectively, the sharp tip to move towards the nearest one of the side faces and puncture a hole in the nearest one of the side faces upon a rise of an internal pressure within the pouch.

15. The rechargeable battery of claim 14, wherein upon an increase of internal pressure within the pouch, a distance between the first and second bonding members increases, causing the link members to transform the movement of the bonding members in the thickness direction of the electrode assembly to a movement of the fin member in a lateral direction orthogonal to the thickness direction of the electrode assembly.

16. The rechargeable battery of claim 14, wherein an internal pressure within the pouch at which the fin member punctures the pouch varies in accordance with a size of the gap between the sharp tip and the nearest of the side faces.

17. The rechargeable battery of claim 14, the second spaces each have a thickness of about one half of a thickness of the electrode assembly.

18. The rechargeable battery of claim 14, wherein the first and the second bonding members each being comprised of a thermal bonded polymer that is thermally bonded to the lower and upper faces respectively of the pouch.

19. The rechargeable battery of claim 14, the first link member having a first end rotatably attached to a fixing unit of the first bonding member by a first pin, and a second and opposite end rotatably attached to an end of the fin member opposite the sharp tip by a second pin, the second link member having a first end rotatably attached to a fixing unit of the second bonding member by a third pin, and a second and opposite end rotatably attached to the end of the fin member opposite the sharp tip by the second pin, each of the first and second link members and the fin member being comprised of a material selected from a group consisting of stainless steel, polypropylene, polyethylene, and polytetrafluoroethylene.

* * * * *